United States Patent
Filipovic et al.

(10) Patent No.: US 9,197,296 B2
(45) Date of Patent: Nov. 24, 2015

(54) METHOD AND APPARATUS FOR MAXIMUM RATIO TRANSMISSION MOBILE TRANSMIT DIVERSITY SYSTEM

(75) Inventors: Daniel F. Filipovic, Solana Beach, CA (US); Chengjin Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 511 days.

(21) Appl. No.: 12/950,043

(22) Filed: Nov. 19, 2010

(65) Prior Publication Data

US 2011/0244912 A1 Oct. 6, 2011

Related U.S. Application Data

(60) Provisional application No. 61/321,093, filed on Apr. 5, 2010, provisional application No. 61/322,806, filed on Apr. 9, 2010.

(51) Int. Cl.
*H04B 7/00* (2006.01)
*H04B 7/04* (2006.01)
*H04B 7/06* (2006.01)

(52) U.S. Cl.
CPC ............ *H04B 7/0443* (2013.01); *H04B 7/0617* (2013.01)

(58) Field of Classification Search
USPC ............ 455/114.2, 114.3, 127.1–127.3, 522, 455/69–70; 370/315–320
See application file for complete search history.

(56) References Cited

U.S. PATENT DOCUMENTS

| 7,113,748 | B2* | 9/2006 | Shapira et al. ............... 455/63.4 |
| 2003/0162566 | A1* | 8/2003 | Shapira et al. ............... 455/561 |
| 2004/0087294 | A1 | 5/2004 | Wang |
| 2008/0051045 | A1 | 2/2008 | Hwang et al. |
| 2010/0103877 | A1* | 4/2010 | Wang et al. .................... 370/328 |
| 2010/0266063 | A1* | 10/2010 | Harel et al. .................... 375/267 |
| 2011/0105174 | A1* | 5/2011 | Pelletier et al. ............... 455/522 |
| 2012/0202555 | A1* | 8/2012 | Bergman et al. .............. 455/522 |
| 2013/0012255 | A1* | 1/2013 | Kim et al. ...................... 455/522 |

FOREIGN PATENT DOCUMENTS

WO   WO03081768 A2   10/2003

OTHER PUBLICATIONS

International Search Report and Written Opinion—PCT/US2011/031215, ISA/EPO—Jul. 25, 2011.

* cited by examiner

*Primary Examiner* — Fayyaz Alam
(74) *Attorney, Agent, or Firm* — Linda G. Gunderson

(57) ABSTRACT

A method and apparatus for providing maximum ratio transmission mobile transmit diversity is provided. The method may include selecting a first transmit power for a first antenna and a second transmit power for a second antenna, wherein the first and second transmit powers are selected to generate a target power output, and using a first average power tracking unit to generate the first selected transmit power and a second average power tracking unit to generate the second selected transmit power.

41 Claims, 6 Drawing Sheets

METHOD AND APPARATUS FOR MAXIMUM RATIO TRANSMISSION MOBILE TRANSMIT DIVERSITY SYSTEM

CROSS-REFERENCE TO RELATED APPLICATION(S)

This application claims the benefit of U.S. Provisional Patent Application Nos. 61/321,093, titled "ARCHITECTURE FOR A MAXIMUM RATIO TRANSMISSION MOBILE TRANSMIT DIVERSITY SYSTEM," filed on Apr. 5, 2010, and 61/322,806, titled "METHOD AND APPARATUS FOR MAXIMUM RATIO TRANSMISSION MOBILE TRANSMIT DIVERSITY SYSTEM," filed on Apr. 9, 2010, which are expressly incorporated by reference herein in their entirety.

BACKGROUND

1. Field

Aspects of the present disclosure relate generally to wireless communication systems, and more particularly, to providing for maximum ratio transmission mobile transmit diversity a cellular wireless communication system.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system. digital rotator A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems and may be used to support mobile transmit diversity. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Mobile transmit diversity (MTD) has been shown to improve edge-of-cell coverage. Additionally, MTD may be used to reduce maximum power requirements on a device. Such power requirement reduction may lead to reduced heat output and therefore enable smaller device size design. Currently, MTD implementations (e.g., antenna switching, beamforming, etc.) have stringent requirements on relative efficiency between antennas.

Thus, improved apparatus and methods for providing maximum ratio transmission mobile transmit diversity a cellular wireless communication system are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in providing for maximum ratio transmission mobile transmit diversity. According to one aspect, a method for providing for maximum ratio transmission mobile transmit diversity is provided. The method can include selecting a first transmit power for a first antenna and a second transmit power for a second antenna, wherein the first and second transmit powers are selected to generate a target power output. Further, the method can comprise using a first average power tracking unit to generate the first selected transmit power and a second average power tracking unit to generate the second selected transmit power.

Another aspect relates to a computer program product comprising a computer-readable medium. The computer-readable medium including code executable to select a first transmit power for a first antenna and a second transmit power for a second antenna, wherein the first and second transmit powers are selected to generate a target power output. Further, the computer-readable medium comprises code executable to use a first average power tracking unit to generate the first selected transmit power and a second average power tracking unit to generate the second selected transmit power.

Yet another aspect relates to an apparatus. The apparatus can comprise means for selecting a first transmit power for a first antenna and a second transmit power for a second antenna, wherein the first and second transmit powers are selected to generate a target power output. Further, the apparatus can comprise means for using a first average power tracking unit to generate the first selected transmit power and a second average power tracking unit to generate the second selected transmit power.

Another aspect relates to an apparatus. The apparatus can include a processor, configured for selecting a first transmit power for a first antenna and a second transmit power for a second antenna, wherein the first and second transmit powers are selected to generate a target power output, and using a first average power tracking unit to generate the first selected transmit power and a second average power tracking unit to generate the second selected transmit power. Further, the apparatus can include a memory coupled to the processor for storing data.

Still another aspect relates to an apparatus. The apparatus can include an efficient transmission module enable for: selecting a first transmit power for a first antenna and a second transmit power for a second antenna, wherein the first and second transmit powers are selected to generate a target power output, and using a first average power tracking unit to generate the first selected transmit power and a second average power tracking unit to generate the second selected transmit power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
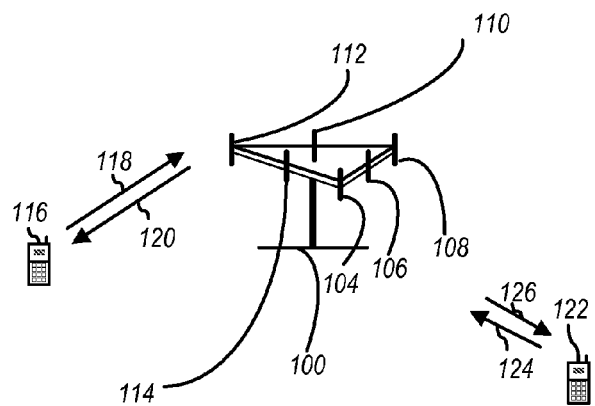
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
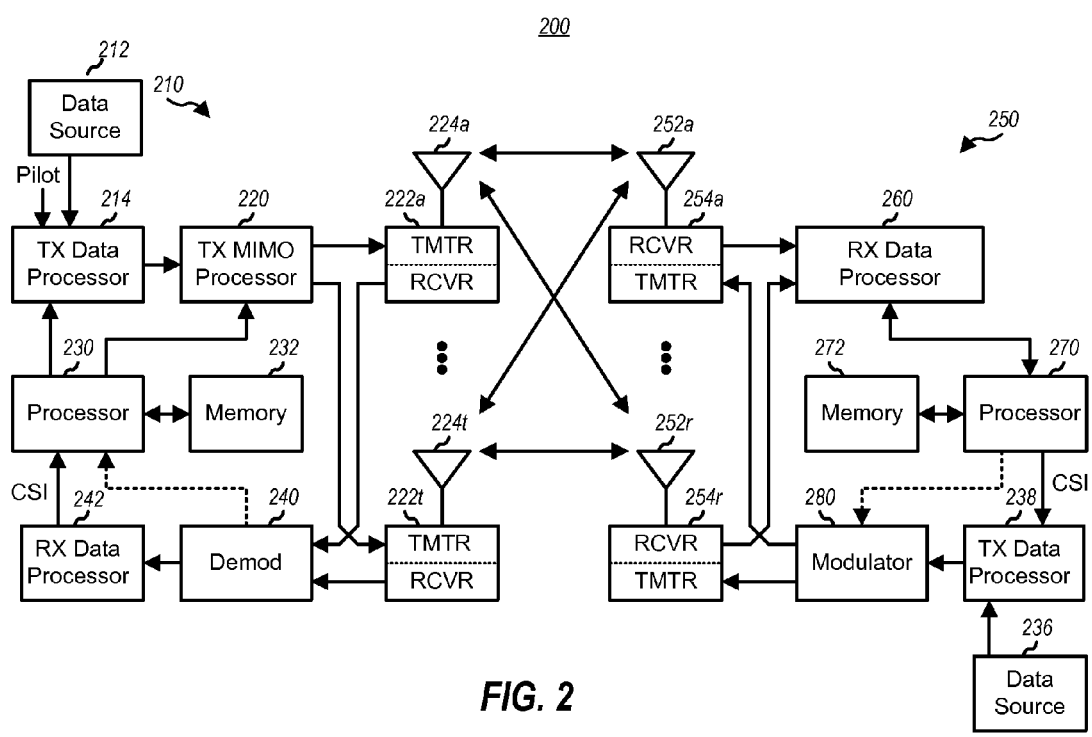
FIG. 2 illustrates a block diagram of a communication system.

FIG. 2 is a block diagram of an embodiment of a transmitter system 210 (also known as the access point) and a receiver system 250 (also known as access terminal) in a MIMO system 200. In one aspect, system 200 may be used to implement one or more mobile transmit diversity schemes. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
In an aspect, a channel structure is provided that preserves low PAR (at any given time, the channel is contiguous or uniformly spaced in frequency) properties of a single carrier waveform.

Figure 3:
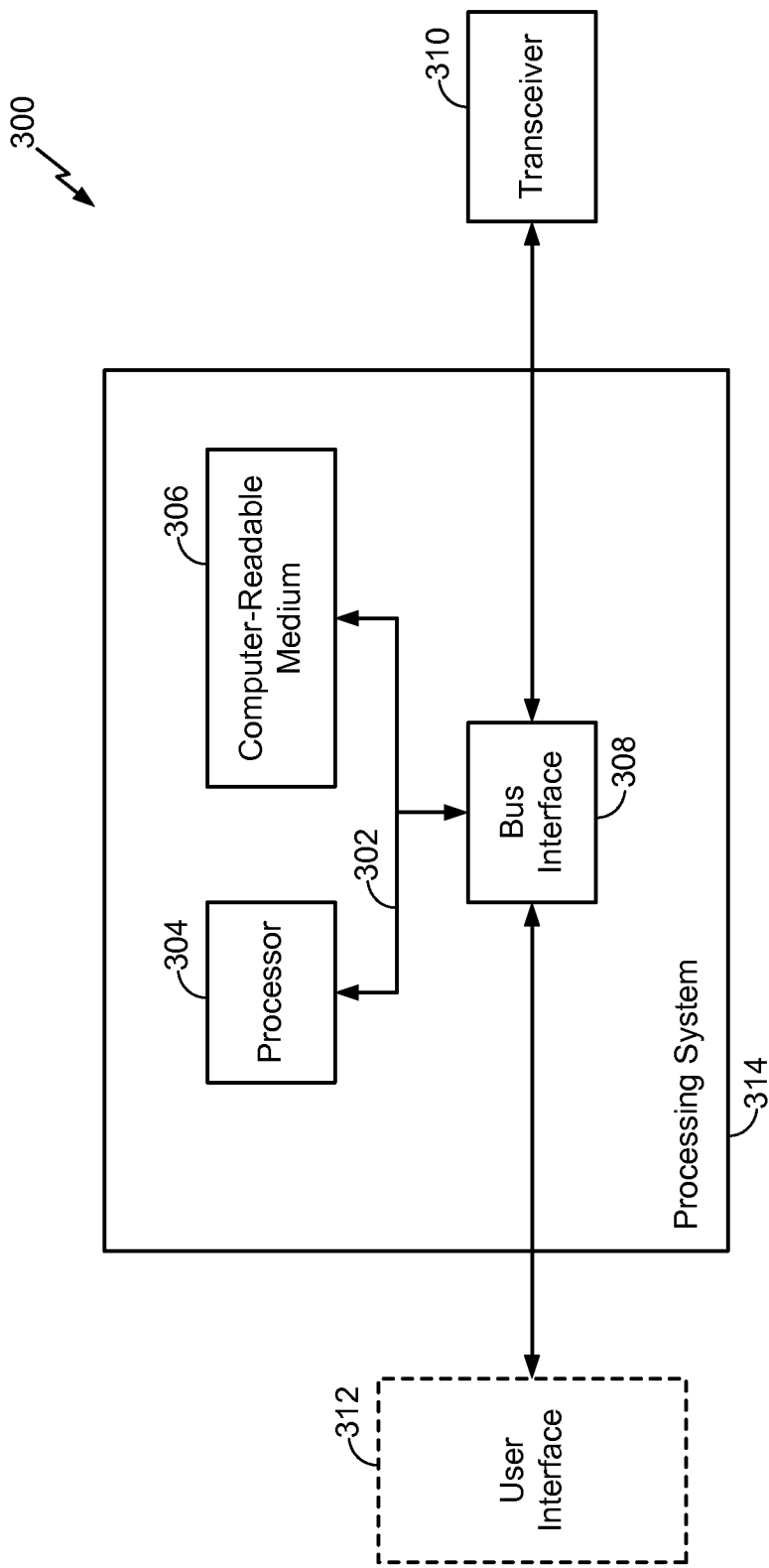
FIG. 3 is a diagram illustrating an example of a hardware implementation for an apparatus employing a processing system.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCHMBMS point-to-multipoint Control CHannel
MRW Move Receiving Window
MSB Most Significant Bit
MSCH MBMS point-to-multipoint Scheduling CHannel
MTCHMBMS point-to-multipoint Traffic CHannel
PCCH Paging Control CHannel
PCH Paging CHannel
PDU Protocol Data Unit
PHY PHYsical layer
PhyCHPhysical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U– User–
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MB SFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel FIG. 3 is a conceptual diagram illustrating an example of a hardware implementation for an apparatus 300 employing a processing system 314. In this example, the processing system 314 may be implemented with a bus architecture, represented generally by the bus 302. The bus 302 may include any number of interconnecting buses and bridges depending on the specific application of the processing system 314 and the overall design constraints. The bus 302 links together various circuits including one or more processors, represented generally by the processor 304, and computer-readable media, represented generally by the computer-readable medium 306. The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described infra for any particular apparatus. The computer-readable medium 306 may also be used for storing data that is manipulated by the processor 304 when executing software.

Figure 4:
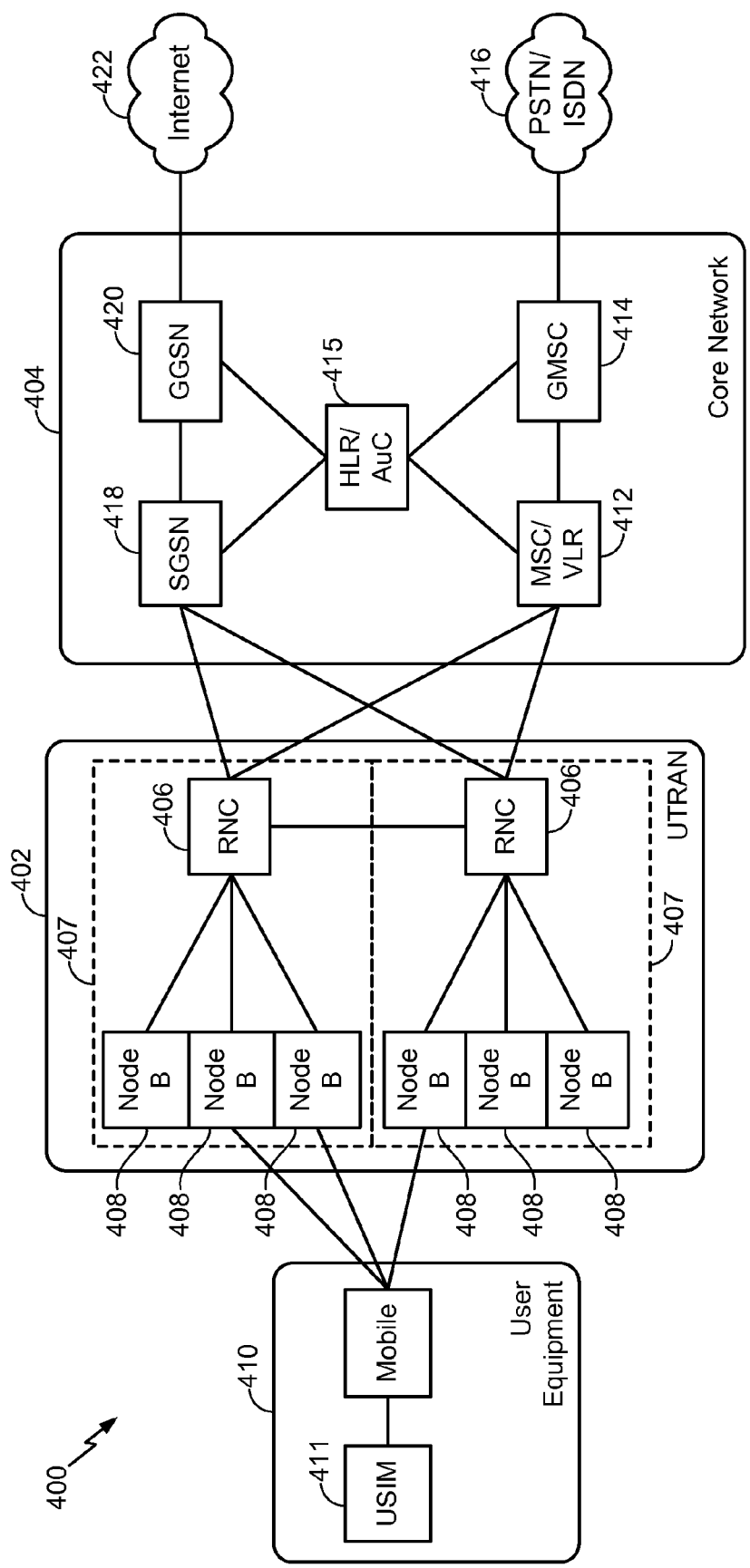
FIG. 4 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 4 are presented with reference to a UMTS system 400 employing a W-CDMA air interface. A UMTS network includes three interacting domains: a Core Network (CN) 404, a UMTS Terrestrial Radio Access Network (UTRAN) 402, and User Equipment (UE) 410. In this example, the UTRAN 402 provides various wireless services including telephony, video, data, messaging, broadcasts, and/or other services. The UTRAN 402 may include a plurality of Radio Network Subsystems (RNSs) such as RNS 407, each including a respective Radio Network Controller (RNC) such as an RNC 406. Here, the UTRAN 402 may include any number of RNCs 406 and RNSs 407 in addition to the RNCs 406 and RNSs 407 illustrated herein. The RNC 406 is an apparatus responsible for, among other things, assigning, reconfiguring and releasing radio resources within the RNS 407. The RNC 406 may be interconnected to other RNCs (not shown) in the UTRAN 402 through various types of interfaces such as a direct physical connection, a virtual network, or the like, using any suitable transport network.

Communication between a UE 410 and a Node B 408 may be considered as including a physical (PHY) layer and a medium access control (MAC) layer. Further, communication between a UE 410 and an RNC 406 by way of a respective Node B 408 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the RNS 407 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. Moreover, certain applications may utilize femtocells served by a home Node B (HNB), home enhanced Node B (HeNB), femto access point (FAP), access point base station, etc. For clarity, in the illustrated example, three Node Bs 408 are shown in each RNS 407;

however, the RNSs 407 may include any number of wireless Node Bs. The Node Bs 408 provide wireless access points to a CN 404 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 410 may further include a universal subscriber identity module (USIM) 411, which contains a user's subscription information to a network. For illustrative purposes, one UE 410 is shown in communication with a number of the Node Bs 408. The downlink (DL), also called the forward link, refers to the communication link from a Node B 408 to a UE 410, and the uplink (UL), also called the reverse link, refers to the communication link from a UE 410 to a Node B 408.

The CN domain 404 interfaces with one or more access networks, such as the UTRAN 402. As shown, the core network 404 is a GSM core network. However, as those skilled in the art will recognize, the various concepts presented throughout this disclosure may be implemented in a RAN, or other suitable access network, to provide UEs with access to types of core networks other than GSM networks.

The core network 404 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 404 supports circuit-switched services with a MSC 412 and a GMSC 414. In some applications, the GMSC 414 may be referred to as a media gateway (MGW). One or more RNCs, such as the RNC 406, may be connected to the MSC 412. The MSC 412 is an apparatus that controls call setup, call routing, and UE mobility functions. The MSC 412 also includes a visitor location register (VLR) that contains subscriber-related information for the duration that a UE is in the coverage area of the MSC 412. The GMSC 414 provides a gateway through the MSC 412 for the UE to access a circuit-switched network 416. The GMSC 414 includes a home location register (HLR) 415 containing subscriber data, such as the data reflecting the details of the services to which a particular user has subscribed. The HLR is also associated with an authentication center (AuC) that contains subscriber-specific authentication data. When a call is received for a particular UE, the GMSC 414 queries the HLR 415 to determine the UE's location and forwards the call to the particular MSC serving that location.

The core network 404 also supports packet-data services with a serving GPRS support node (SGSN) 418 and a GGSN 420. GPRS, which stands for General Packet Radio Service, is designed to provide packet-data services at speeds higher than those available with standard circuit-switched data services. The GGSN 420 provides a connection for the UTRAN 402 to a packet-based network 422. The packet-based network 422 may be the Internet, a private data network, or some other suitable packet-based network. The primary function of the GGSN 420 is to provide the UEs 410 with packet-based network connectivity. Data packets may be transferred between the GGSN 420 and the UEs 410 through the SGSN 418, which performs primarily the same functions in the packet-based domain as the MSC 412 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 408 and a UE 410. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

Figure 5:
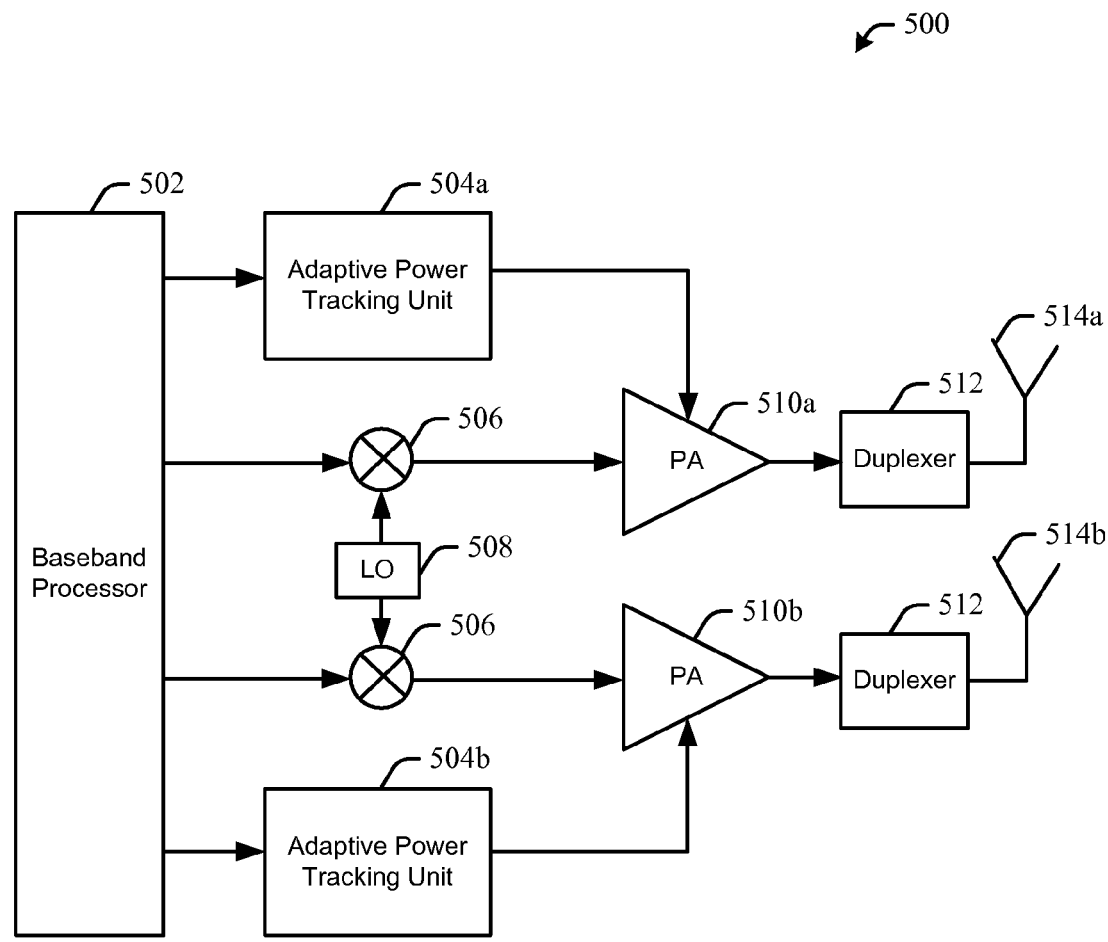
FIG. 5 illustrates an example maximum ratio transmission system according to an aspect.

FIG. 5 illustrates an example maximum ratio transmission system 500. The maximum ratio transmission system 500 may include baseband processor 502, multiple adaptive power tracking units (504a, 504b), multiple mixers 506, one or more local oscillators 508, multiple power amplifiers (510a, 510b), multiple duplexers 512 and multiple transmit antennas (514a, 514b). As such, maximum ratio transmission system 500 may be enabled to transmit using multiple RF chains, where a single RF chain includes the baseband processor 502, a adaptive power tracking units (e.g., 504a), a mixer 506, a local oscillator 508, a power amplifiers (e.g., 510a), a duplexer 512 and a transmit antenna (e.g., 514a). In another aspect, a single local oscillator 508 may be used across multiple RF transmit chains. Further, as depicted in FIG. 5 a single RF transceiver (RTR) chip is used, although, in one aspect, two RTR chips may be used. In one aspect, maximum ratio transmission system 500 may be operable to enable communication using transmit diversity. Transmit diversity has been shown to improve edge-of-cell coverage. Further, maximum ratio transmission system 500 may be operable to reduce maximum power requirements on a device 500, which can lead to reduced heat output and therefore smaller device 500 size.

In operation, maximum ratio transmission system 500 may be operable to enable transmit diversity while using a maximum ratio transmission scheme to facilitate beamforming. In one aspect, power amplifiers (PAs) (510a, 510b) may have maximum output power values adjusted through use of the adaptive power tracking (APT) units (504a, 504b). For example, the PAs maximum output power may be adjusted according to a supply voltage from the APT units. Further, PA supply voltage may be varied according to a determined transmit power. Still further, the PA output power may be adjust for maximum ratio transmission and the PA supply voltage may be adjusted to optimize PA efficient. In one aspect, during certain states, such as but not limited to, initiating access, system acquisition, random access, etc., the maximum ratio transmission system 500 may use only one of the multiple PAs (e.g., 510a) at full power.

In operation, during transmissions using a transmit diversity scheme, maximum ratio transmission system 500 may independently phase adjust a signal over multiple paths (e.g., RF chains) using digital rotators. In another aspect maximum ratio transmission system 500 may adjust the phase of multiple signals by inverting a component of the signal (e.g., through a RF chip inverting one or more components).

Figure 6:
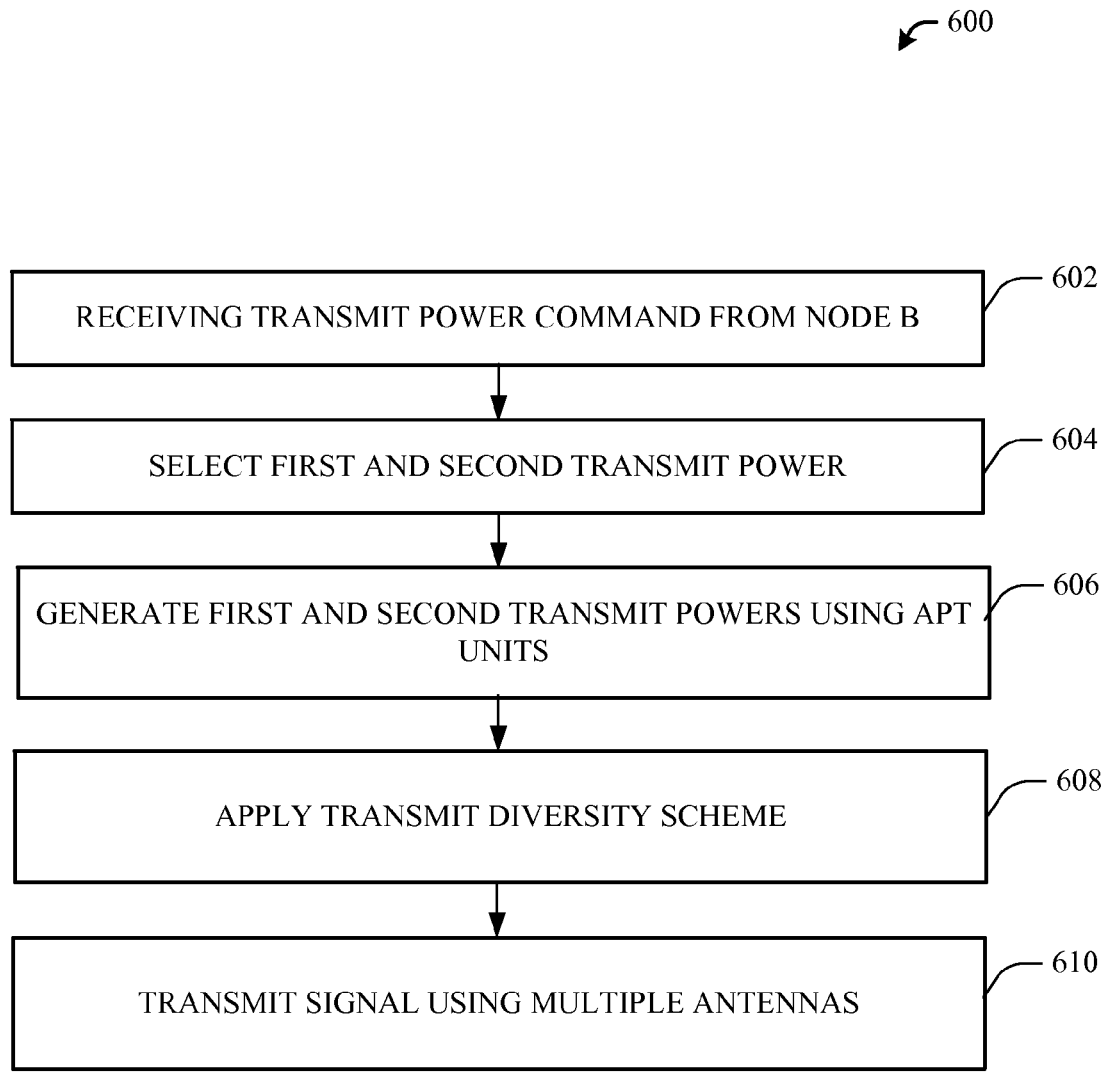
FIG. 6 illustrates an example flow diagram of a methodology enabling uplink transmit diversity using one or more beamforming schemes according to an aspect.

FIG. 4 illustrates various methodologies in accordance with various aspects of the presented subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media Turning now to FIG. 6, example method 600 for enabling a maximum ratio transmission mobile transmit diversity system. At reference numeral 602 a transmit power command may be received from a serving Node B. At reference numeral 604, a first transmit power and a second transmit power may be selected. In one aspect, the first and second transmit powers are selected using a maximum ratio transmission algorithm. In one aspect, the maximum ratio transmission algorithm may be operable to apply a phase shift to one or more components of a signal transmitted using the first and second antennas. In such an aspect, the transmit powers may be selected to generate coherent addition of the power of a transmitted signal. In one aspect, if the received transmit power command prompts a UE to transmit at an output value below a threshold, then the second transmit power may be selected to be zero. At reference numeral 606, the first and second transmit power values are generated using voltages received from a first and second adaptive power tracking units. At reference numeral 608 a transmit diversity scheme may be applied to a signal to be transmitted. In one aspect, a transmit diversity scheme allow for independent phase adjustment of a signal over multiple paths (e.g., RF chains) using digital rotators. In another aspect, a transmit diversity scheme allow for adjustment of the phase of multiple signals by inverting a component of the signal (e.g., through a RF chip inverting one or more components). At reference numeral 610, a signal may be transmitted using multiple antennas. In one aspect, the multiple antennas may be virtual antennas.

Figure 7:
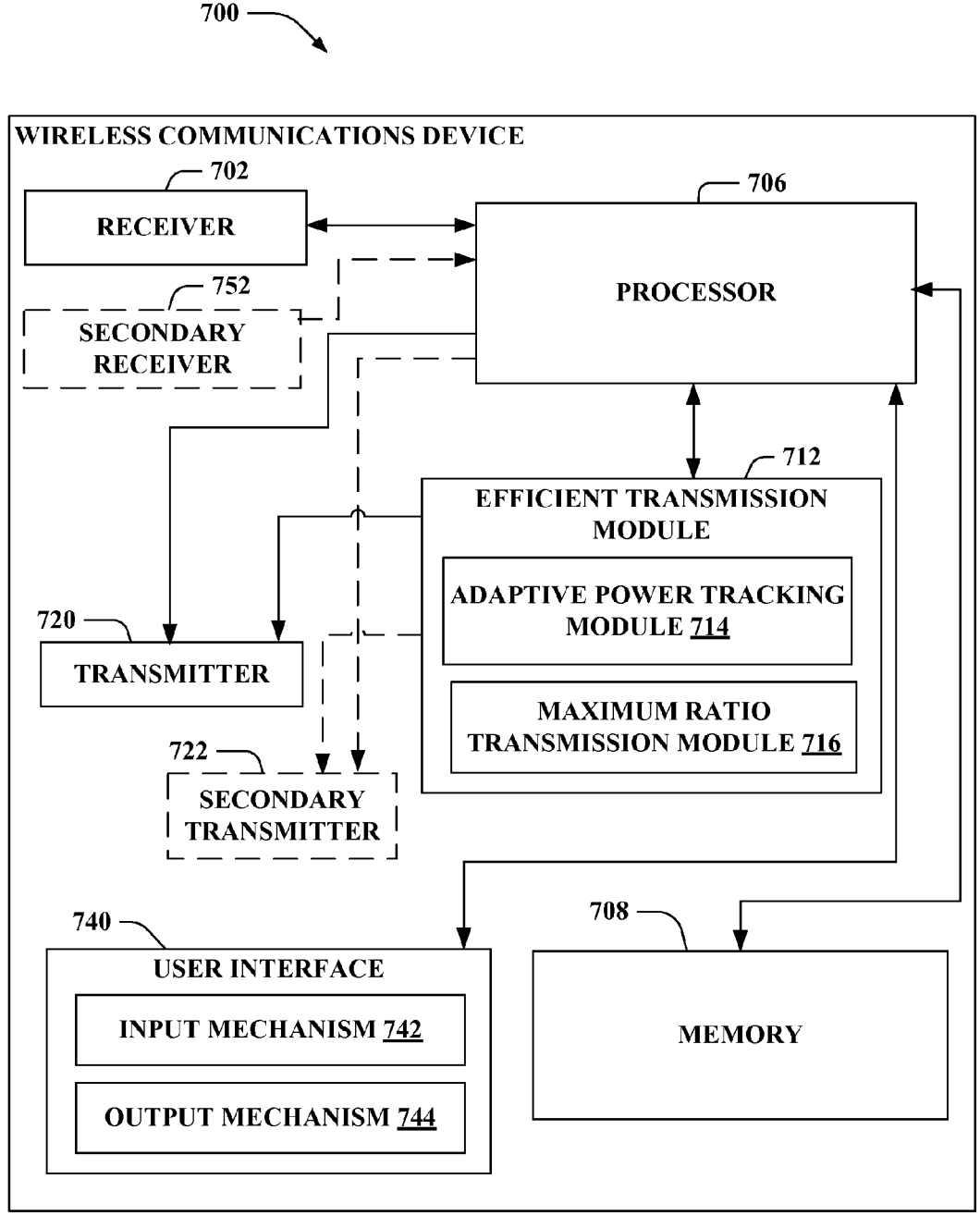
FIG. 7 illustrates a block diagram of an example wireless communications device that can enable enhanced uplink operations according to an aspect.

With reference now to FIG. 7, an illustration of a user equipment (UE) 700 (e.g. wireless communications device (WCD), client device, etc.) that enabled efficient uplink transmission is presented. UE 700 comprises receiver 702 that receives one or more signal from, for instance, one or more receive antennas (not shown), performs typical actions on (e.g., filters, amplifies, downconverts, etc.) the received signal, and digitizes the conditioned signal to obtain samples. Receiver 702 can comprise an oscillator that can provide a carrier frequency for demodulation of the received signal and a demodulator that can demodulate received symbols and provide them to processor 706 for channel estimation. In one aspect, UE 700 may further comprise secondary receiver 752 and may receive additional channels of information.

Processor 706 can be a processor dedicated to analyzing information received by receiver 702 and/or generating information for transmission by one or more transmitters 720 (for ease of illustration, only transmitter 720 and an optional secondary transmitter 722 are shown), a processor that controls one or more components of UE 700, and/or a processor that both analyzes information received by receiver 702 and/or secondary receiver 752, generates information for transmission by transmitter 720 for transmission on one or more transmitting antennas (not shown), and controls one or more components of UE 700. In one aspect, UE 700 may further comprise secondary transmitter 722 and may transmit additional channels of information.

User equipment 700 can additionally comprise memory 708 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 708 of the subject systems and methods is intended to comprise, without being limited to, these and any other suitable types of memory.

User equipment 700 can further comprise efficient transmission module 712 to enable maximum ratio transmission mobile transmit diversity operations. Efficient transmission module 712 may further include adaptive power tracking module 714 to determine voltage levels to apply to a power amplifier. Additionally, power control module 712 may further include maximum ratio transmission module 716 to determine one or more transmit power levels to allow for beamforming and/or coherent addition in a transmitted signal.

In one aspect, efficient transmission module 712 may directly communicate with at least one of transmitter 720 and secondary transmitter 722. Further, processor 706 and/or efficient transmission module 712 can provide means for selecting a first transmit power for a first antenna and a second transmit power for a second antenna, wherein the first and second transmit powers are selected to generate a target power output, and means for using a first average power tracking unit to generate the first selected transmit power and a second average power tracking unit to generate the second selected transmit power. In another aspect, processor 706 and/or efficient transmission module 712 may further provide means for receiving a transmit power command from a Node B, wherein the target power output is determined from the transmit power command. In another aspect, processor 706 and/or efficient transmission module 712 may further provide means for selecting the first and second transmit powers using a maximum ratio transmission algorithm. In another aspect, processor 706 and/or efficient transmission module 712 may further provide means for dividing a signal using a transmit diversity scheme, and means for transmitting the divided signal using the first and second antennas. In another aspect, processor 706 and/or efficient transmission module 712 may further provide means for oscillating the signals, where the divided signals are oscillated using a common local oscillator. In another aspect, processor 706 and/or efficient transmission module 712 may further provide means for determining that the target transmit power is below a threshold, and means for selecting the transmit power to result in no transmission from the second antenna.

Additionally, mobile device 700 may include user interface 740. User interface 740 may include input mechanism 742 for generating inputs into wireless device 700, and output mechanism 742 for generating information for consumption by the user of wireless device 700. For example, input mechanism 742 may include a mechanism such as a key or keyboard, a mouse, a touch-screen display, a microphone, etc. Further, for example, output mechanism 744 may include a display, an audio speaker, a haptic feedback mechanism, a Personal Area Network (PAN) transceiver etc. In the illustrated aspects, output mechanism 744 may include a display operable to present media content that is in image or video format or an audio speaker to present media content that is in an audio format.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method used in wireless communication system, the method comprising:
    selecting, at a user equipment, a first transmit power for a first antenna and a second transmit power for a second antenna, wherein the first and second transmit powers are selected to generate a target power output;
    applying a phase shift to one or more components of a signal transmitted using the first and second antennas;
    using a first adaptive power tracking unit to adjust a first power amplifier to generate the first selected transmit power and a second adaptive power tracking unit to adjust a second power amplifier to generate the second selected transmit power;
    wherein the first and second transmit powers are selected using a maximum ratio transmission algorithm; and
    wherein the first and second adaptive power tracking units adjust the first and second power amplifiers so that only one of the first and second power amplifiers operate at full power if the user equipment is in a state selected from the group consisting of an initiating access state, a system acquisition state, and a random access state.

2. The method of claim 1, further comprising:
    receiving a transmit power command from a Node B, wherein the target power output is determined from the transmit power command.

3. The method of claim 1, wherein the maximum ratio transmission algorithm selects the first and second transmit powers to result in beamforming for a transmitted signal.

4. The method of claim 1, further comprising:
    dividing a signal using a transmit diversity scheme; and
    transmitting the divided signal using the first and second antennas.

5. The method of claim 4, wherein the divided signals are oscillated using a common local oscillator.

6. The method of claim 4, wherein the divided signals are phase adjusted using at least one of:
one or more digital rotators;
a baseband processor; or
an RF chip, wherein the RF chip adjusts the phase by inverting one or more components of the divided signal.

7. The method of claim 1, further comprising:
determining that the target transmit power is below a threshold; and
wherein the second selected transmit power is selected to result in no transmission from the second antenna.

8. The method of claim 1, further comprising:
detecting the presence of a Node B;
initialing access to the detected Node B; and
wherein the second selected transmit power is selected to result in no transmission from the second antenna.

9. An apparatus operable in wireless communication system, the apparatus comprising:
means for selecting, at a user equipment, a first transmit power for a first antenna and a second transmit power for a second antenna, wherein the first and second transmit powers are selected to generate a target power output;
means for applying a phase shift to one or more components of a signal transmitted using the first and second antennas;
means for using a first adaptive power tracking unit to adjust a first power amplifier to generate the first selected transmit power and a second adaptive power tracking unit to adjust a second power amplifier to generate the second selected transmit power;
wherein means for selecting further comprises means for selecting the first and second transmit powers using a maximum ratio transmission algorithm; and
wherein the first and second adaptive power tracking units adjust the first and second power amplifiers so that only one of the first and second power amplifiers operate at full power if the user equipment is in a state selected from the group consisting of an initiating access state, a system acquisition state, and a random access state.

10. The apparatus of claim 9, further comprising:
means for receiving a transmit power command from a Node B, wherein the target power output is determined from the transmit power command.

11. The apparatus of claim 9, wherein the maximum ratio transmission algorithm selects the first and second transmit powers to result in beamforming for a transmitted signal.

12. The apparatus of claim 9, further comprising:
means for dividing a signal using a transmit diversity scheme; and
means for transmitting the divided signal using the first and second antennas.

13. The apparatus of claim 12, wherein the means for dividing the signals further comprises means for oscillating the signals, wherein the divided signals are oscillated using a common local oscillator.

14. The apparatus of claim 12, wherein the means for dividing the signals further comprises means for phase adjusting the signals, wherein the divided signals are phase adjusted using at least one of:
one or more digital rotators;
a baseband processor; or
an RF chip, wherein the RF chip adjusts the phase by inverting one or more components of the divided signal.

15. The apparatus of claim 9, further comprising:
means for determining that the target transmit power is below a threshold; and
wherein the means for selecting the second transmit power further includes means for selecting the transmit power to result in no transmission from the second antenna.

16. The apparatus of claim 9, further comprising:
means for detecting the presence of a Node B;
means for initialing access to the detected Node B; and
wherein the means for selecting the second transmit power further includes selecting the transmit power to result in no transmission from the second antenna.

17. A computer program product, comprising:
a non-transitory computer-readable medium comprising code for:
selecting, at a user equipment, a first transmit power for a first antenna and a second transmit power for a second antenna, wherein the first and second transmit powers are selected to generate a target power output;
applying a phase shift to one or more components of a signal transmitted using the first and second antennas;
using a first adaptive power tracking unit to adjust a first power amplifier to generate the first selected transmit power and a second adaptive power tracking unit to adjust a second power amplifier to generate the second selected transmit power;
wherein the first and second transmit powers are selected using a maximum ratio transmission algorithm; and
wherein the first and second adaptive power tracking units adjust the first and second power amplifiers so that only one of the first and second power amplifiers operate at full power if the user equipment is in a state selected from the group consisting of an initiating access state, a system acquisition state, and a random access state.

18. The computer program product of claim 17, wherein the computer-readable medium further comprises code for:
receiving a transmit power command from a Node B, wherein the target power output is determined from the transmit power command.

19. The computer program product of claim 17, wherein the maximum ratio transmission algorithm selects the first and second transmit powers to result in beamforming for a transmitted signal.

20. The computer program product of claim 17, wherein the computer-readable medium further comprises code for:
dividing a signal using a transmit diversity scheme; and
transmitting the divided signal using the first and second antennas.

21. The computer program product of claim 20, wherein the divided signals are oscillated using a common local oscillator.

22. The computer program product of claim 20, wherein the divided signals are phase adjusted using at least one of:
one or more digital rotators;
a baseband processor; or
an RF chip, wherein the RF chip adjusts the phase by inverting one or more components of the divided signal.

23. The computer program product of claim 17, wherein the computer-readable medium further comprises code for:
determining that the target transmit power is below a threshold; and
wherein the second selected transmit power is selected to result in no transmission from the second antenna.

24. The computer program product of claim 17, wherein the computer-readable medium further comprises code for:
  detecting the presence of a Node B;
  initialing access to the detected Node B; and
  wherein the second selected transmit power is selected to result in no transmission from the second antenna.

25. An apparatus operable in a wireless communication system, the apparatus comprising:
  a processor at a user equipment, configured for selecting a first transmit power for a first antenna and a second transmit power for a second antenna, wherein the first and second transmit powers are selected to generate a target power output, applying a phase shift to one or more components of a signal transmitted using the first and second antennas, and using a first adaptive power tracking unit to adjust a first power amplifier to generate the first selected transmit power and a second adaptive power tracking unit to adjust a second power amplifier to generate the second selected transmit power;
  a memory coupled to the processor for storing data;
  wherein the first and second transmit powers are selected using a maximum ratio transmission algorithm; and
  wherein the first and second adaptive power tracking units adjust the first and second power amplifiers so that only one of the first and second power amplifiers operate at full power if the user equipment is in a state selected from the group consisting of an initiating access state, a system acquisition state, and a random access state.

26. The apparatus of claim 25, wherein the processor is further configured for receiving a transmit power command from a Node B, wherein the target power output is determined from the transmit power command.

27. The apparatus of claim 25, wherein the maximum ratio transmission algorithm selects the first and second transmit powers to result in beamforming for a transmitted signal.

28. The apparatus of claim 25, wherein the processor is further configured for:
  dividing a signal using a transmit diversity scheme; and
  transmitting the divided signal using the first and second antennas.

29. The apparatus of claim 28, wherein the divided signals are oscillated using a common local oscillator.

30. The apparatus of claim 28, wherein the divided signals are phase adjusted using at least one of:
  one or more digital rotators;
  a baseband processor; or
  an RF chip, wherein the RF chip adjusts the phase by inverting one or more components of the divided signal.

31. The apparatus of claim 25, wherein the processor is further configured for:
  determining that the target transmit power is below a threshold; and
  wherein the second selected transmit power is selected to result in no transmission from the second antenna.

32. The apparatus of claim 25, wherein the processor is further configured for:
  detecting the presence of a Node B;
  initialing access to the detected Node B; and
  wherein the second selected transmit power is selected to result in no transmission from the second antenna.

33. A user equipment for wireless communication, comprising:
  a transmission module configured to:
    select a first transmit power for a first antenna and a second transmit power for a second antenna, wherein the first and second transmit powers are selected to generate a target power output;
    apply a phase shift to one or more components of a signal transmitted using the first and second antennas;
  a first adaptive power tracking unit configured to adjust a first power amplifier to generate the first selected transmit power and a second adaptive power tracking unit to adjust a second power amplifier to generate the second selected transmit power;
  wherein the first and second transmit powers are selected using a maximum ratio transmission algorithm; and
  wherein the first and second adaptive power tracking units adjust the first and second power amplifiers so that only one of the first and second power amplifiers operate at full power if the user equipment is in a state selected from the group consisting of an initiating access state, a system acquisition state, and a random access state.

34. The apparatus of claim 33, further comprising a receiver operable for receiving a transmit power command from a Node B, wherein the target power output is determined from the transmit power command.

35. The apparatus of claim 33, wherein the maximum ratio transmission algorithm selects the first and second transmit powers to result in beamforming for a transmitted signal.

36. The apparatus of claim 33, wherein the efficient transmission module is further operable for dividing a signal using a transmit diversity scheme; and further comprising a transmitter operable for transmitting the divided signal using the first and second antennas.

37. The apparatus of claim 36, wherein the divided signals are oscillated using a common local oscillator.

38. The apparatus of claim 36, wherein the divided signals are phase adjusted using at least one of:
  one or more digital rotators
  a baseband processor; or
  an RF chip, wherein the RF chip adjusts the phase by inverting one or more components of the divided signal.

39. The apparatus of claim 33, wherein the efficient transmission module is further operable for:
  determining that the target transmit power is below a threshold; and
  wherein the second selected transmit power is selected to result in no transmission from the second antenna.

40. The apparatus of claim 33, wherein the efficient transmission module is further operable for:
  detecting the presence of a Node B;
  initialing access to the detected Node B; and
  wherein the second selected transmit power is selected to result in no transmission from the second antenna.

41. The method of claim 1, further comprising:
  selecting a transmit power of the signal transmitted using the first and second antennas to generate coherent addition of the power of the transmitted signal.

* * * * *